United States Patent
Fukuda

(10) Patent No.: US 8,164,455 B2
(45) Date of Patent: Apr. 24, 2012

(54) BACKSCATTER COMMUNICATION SYSTEM WITH REFLECTOR FOR TRANSMITTING A MODULATED SIGNAL TO A READER

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 548 days.

(21) Appl. No.: 12/370,962

(22) Filed: Feb. 13, 2009

(65) Prior Publication Data
US 2009/0243804 A1    Oct. 1, 2009

(30) Foreign Application Priority Data
Mar. 25, 2008    (JP) .................... 2008-077872

(51) Int. Cl.
*G08B 13/14* (2006.01)
(52) U.S. Cl. .............. 340/572.1; 340/572.4; 340/10.1
(58) Field of Classification Search ........... 340/572.1
See application file for complete search history.

(56) References Cited

U.S. PATENT DOCUMENTS

| 6,388,360 | B1 * | 5/2002 | Nysen et al. ......... 310/313 R |
| 6,812,824 | B1 | 11/2004 | Goldinger et al. |
| 2005/0083179 | A1 | 4/2005 | Carrender et al. |
| 2005/0253688 | A1 * | 11/2005 | Fukuda ................ 340/10.4 |
| 2006/0046774 | A1 | 3/2006 | Fukuda |
| 2008/0136644 | A1 * | 6/2008 | McCorkle ............ 340/572.3 |
| 2008/0274697 | A1 * | 11/2008 | Ito ........................... 455/42 |

FOREIGN PATENT DOCUMENTS

| CN | 1710897 A | 12/2005 |
| EP | 1 607 764 A1 | 12/2005 |
| EP | 1 998 468 A2 | 12/2008 |
| JP | 2005-64822 | 3/2005 |
| JP | 2005-136666 | 5/2005 |
| JP | 2005-136943 | 5/2005 |

OTHER PUBLICATIONS

Office Action issued Dec. 22, 2010 in Chinese Application No. 200910128098.8 (With English Translation).

* cited by examiner

*Primary Examiner* — George Bugg
*Assistant Examiner* — Kerri McNally
(74) *Attorney, Agent, or Firm* — Oblon, Spivak, McClelland, Maier & Neustadt, L.L.P.

(57) ABSTRACT

The present invention provides a communication system of a backscatter type, the communication system including: a reflector for transmitting data by a reflected wave formed by subjecting a non-modulated wave to a modulation process; and a reflected wave reader for reading the data from the modulated reflected wave signal from the reflector.

8 Claims, 5 Drawing Sheets

FOUR VALUE $V_c$

EIGHT-VALUE BPSK RECEIVING SIDE SYNCHRONOUS DETECTION OUTPUT

BACKSCATTER COMMUNICATION SYSTEM WITH REFLECTOR FOR TRANSMITTING A MODULATED SIGNAL TO A READER

CROSS REFERENCES TO RELATED APPLICATIONS

The present invention contains subject matter related to Japanese Patent Application JP 2008-077872, filed in the Japan Patent Office on Mar. 25, 2008, the entire contents of which being incorporated herein by reference.

BACKGROUND OF THE INVENTION

1. Field of the Invention

The present invention relates to a communication system in which a terminal (transponder) that does not have its own radio wave generating source transmits data to a host (reader/writer) in a noncontact manner, and a communication device, and particularly to a communication system of a reflected wave transmission (backscatter) type including a reflector (transponder) for transmitting data by a reflected wave formed by subjecting a non-modulated wave to a modulation process and a reflected wave reader (reader/writer) for reading the data from the modulated reflected wave signal from the reflector, and a communication device.

2. Description of the Related Art

More specifically, the present invention relates to a communication system and a communication device that increase the speed of reflected wave transmission without widening a frequency band, and particularly to a communication system and a communication device that increase the speed of reflected wave transmission by increasing the number of levels of reflected waves.

A noncontact communication system referred to as RFID (Radio Frequency IDentification) is known as a communication system that does not have its own radio wave generating source and which transmits data by radio. While other names of RFID include an "ID system," a "data carrier system," and the like, the universally common name is an RFID system, or RFID for short. RFID means "a recognizing system using high frequencies (radio)." An RFID system is composed of a transponder referred to also as a tag and a reader/writer for accessing the transponder. The transponder passively operates using a radio wave from the reader/writer side as an energy source. The reader/writer reads information stored within the transponder, and writes information to the transponder.

Noncontact communication methods in the RFID system include a capacitive coupling method, an electromagnetic induction method, a radio wave communication method, and the like. In an RFID system of the radio wave communication method among these methods, a transponder has a reflector for transmitting data by a reflected wave formed by subjecting a non-modulated wave to a modulation process, a reader/writer has a reflected wave reader for reading the data from the modulated reflected wave signal from the reflector, and reflected wave transmission referred to also as "backscatter" is performed. When the non-modulated wave is transmitted from the reflected wave reader to the reflector, the reflector superimposes transmission data on the reflected wave of the non-modulated wave by modulating the reflected wave on the basis of an operation of changing antenna load impedance or the like. That is, the reflector side does not need a carrier generating source in data transmission, and thus drives a data transmitting operation with a low consumption. The reflected wave reader side can obtain the transmission data by receiving such a modulated reflected wave and performing demodulation and a decoding process.

The reflector basically includes an antenna for reflecting an incident continuous radio wave, a circuit for generating transmission data, and an impedance changing circuit for changing the load impedance of the antenna in such a manner as to correspond to the transmission data. The impedance changing circuit is for example an antenna switch for changing the termination of the antenna to an open/ground. While the antenna switch can be incorporated into a communication circuit module and formed by a CMOS (Complementary Metal Oxide Semiconductor) transistor, a high-speed changing operation with low power consumption is made possible by separating the antenna switch from the circuit module and forming the antenna switch by a gallium arsenide (GaAs) IC (Integrated Circuit) In the latter case, a rate of data transmission by reflected wave modulation is improved, and the power consumption is reduced to a few ten µW or less. Therefore, considering a fact that a wireless LAN (Local Area Network) consumes a power of a few hundred mW to a few W at a time of communication, reflected wave communication can be said to have an overwhelming difference in performance as compared with the average power consumption of a common wireless LAN (see for example Japanese Patent Laid-Open No. 2005-064822).

In addition, because the transponder including the reflector performs only an operation of reflecting a received radio wave, the transponder has another advantage of not being regarded as a radio station and not being subject to legal control imposed on radio wave communications. Further, while a noncontact communication system of the past uses frequencies of a few MHz to a few hundred MHz (for example 13.56 MHz), the reflected wave transmission system can achieve high-speed data transmission using a high band of a 2.4 GHz band (microwaves) referred to as an ISM band (Industrial, Scientific and Medical band), for example.

As an example of application of a communication system using reflected wave transmission, there is a case where a reflector as a transponder is incorporated into a terminal as a data source such as a digital still camera, a digital video camera or the like, a host such as a television set, a printer or the like is provided with a function of a reflected wave reader, and data such as still images, moving images or the like is uploaded by reflected wave transmission for display or printout processing.

FIG. 8 shows a configuration of a reflector as a data transmitting source in a reflected wave transmission system. The reflector 10 shown in FIG. 8 includes an antenna 11, an antenna switch 12, an antenna load 13, a band-pass filter 14, and an ASK (Amplitude Shift Keying) detecting section 15. Suppose that a 2.4 GHz band referred to as an ISM band is used for radio wave frequencies.

When the antenna switch 12 is on, the antenna 11 is terminated by the antenna load 13 of 50Ω. When the antenna switch 12 is off, the antenna 11 is open. By such a switching operation, the antenna 11 behaves to be terminated for a non-modulated carrier coming from a reflected wave reader when the antenna switch 12 is on, and behaves to reflect the non-modulated carrier when the antenna switch 12 is off, so that a modulation process can be applied to the reflected wave.

When a communication controlling section 16 receives transmission data generated by a higher-layer application (not shown), the communication controlling section 16 performs on/off operation on the antenna switch 12 connected to the antenna 11 according to the bit image of data. For example, the antenna switch 12 is turned on when the data is 1, and the antenna switch 12 is turned off when the data is 0. That is, the transmission data is transmitted as a reflected wave signal modulated by variations in antenna load impedance which variations accompany the on/off operation on the antenna switch 12.

Incidentally, while the band-pass filter (BPF) 14 and the ASK detecting section 15 are used at a time of receiving an ASK-modulated delivery acknowledgment signal (or data) from the transfer destination, the two blocks are unnecessary when transmission is performed in one direction without transmission delivery acknowledgment.

FIG. 9 shows a hardware configuration of an information device 20 having a reflected wave reader function as a data receiving destination in the reflected wave transmission system.

The information device 20 includes an antenna 21 for a 2.4 GHz band, an antenna switch for alternatively connecting the antenna 21 according to transmitting and receiving operation or a circulator 22 as a substitute for the antenna switch, a receiving section 23, a transmitting section 26, a baseband controlling section 30, a decoding section 31, and an information processing section 32 for performing various arithmetic processing for received data after decoding.

In order to read a reflected wave signal from the reflector 10, a non-modulated carrier for creating a reflected wave needs to be transmitted from the reflected wave reader. In this case, the receiving section 23 includes a quadrature detecting block 24 and an AGC (Automatic Gain Control) amplifier 25. The transmitting section 26 includes a mixer 27 and a power amplifier 28. A frequency synthesizer 29 is further provided.

The transmission of a non-modulated carrier from the transmitting section 26 is achieved by supplying a certain direct-current voltage from the baseband (BB) controlling section 30 to the mixer 27. The frequency of the non-modulated carrier to be transmitted is determined by the frequency of the frequency synthesizer controlled from the baseband controlling section 30. The 2.4 GHz band is used in this case. The non-modulated wave output from the mixer 27 is amplified to a predetermined level by the power amplifier 28, and then sent out from the antenna 21 via the circulator 22.

A reflected wave signal from the reflector 10 has the same frequency as the non-modulated carrier transmitted from the reflected wave reader itself included in the information device 20. The reflected wave signal is received by the antenna 21, and then input to the above-described receiving section 23 via the circulator 22. Because the same local frequency as in transmission is input to the quadrature detecting block 24, an ASK modulating wave applied in the reflector 10 appears in the output of the quadrature detecting block 24. However, the received signal is different in phase from the local signal, and therefore a modulating signal corresponding to a phase difference between the signals appears as an I-axis signal and a Q-axis signal.

The gain of the AGC amplifier 25 is controlled to an optimum value, and output signals of the AGC amplifier 25 are sent to the baseband-controlling section 30. The baseband controlling section 30 performs demodulation from the I-axis signal and the Q-axis signal to digital data. The decoding section 31 decodes the digital data into correct data. The decoded data is thereafter subjected to various processing including reproduction of data contents and storage in the information processing section 32.

When data delivery acknowledgment is to be made to the reflector 10, the baseband controlling section 30 transfers digital data of positive acknowledgement Ack to the mixer 27 when the received packet data is correct, and transfers digital data of negative acknowledgement Nack to the mixer 27 when the received packet data is incorrect. The baseband controlling section 30 then applies ASK modulation to the digital data. Whether the data is correct or incorrect is determined by a CRC (Cyclic Redundancy Check) code added to an image data packet.

In the above-described reflected wave transmitting operation, the reflected wave signal sent out from the reflector 10 is equivalent to an ASK (Amplitude Shift Keying) modulated wave. Other modulating methods for generating a reflected wave include PSK (Phase Shift Keying).

FIG. 10 shows a configuration of a reflector that generates a reflected wave by PSK. Reference numeral 100 denotes an antenna, and reference numeral 101 denotes a high-frequency switch formed by a diode, a gallium arsenide FET (Field Effect Transistor) or the like. One side of a strip line 102 as a $\lambda/4$ (where $\lambda$ is a wavelength being used) phase shifter is open, and therefore when the high-frequency switch 101 is turned on, the antenna 100 is connected to a ground in terms of high frequency. The high-frequency switch 101 is subjected to on/off operation on the basis of transmission data (TX_DATA). The high-frequency switch 101 is controlled to be shorted when turned on, and is controlled to be open when turned off. Thus, by controlling a reflecting end to be shorted and open according to the transmission data, PSK modulation can be applied to the reflected wave of a radio wave arriving at the antenna 100.

However, modulation systems with a relatively low bit rate such as ASK, PSK and the like have a problem in terms of transmission speed.

For example, a communication device has been proposed which includes: a first signal path that provides a first reflected wave by directly reflecting a received radio wave without the radio wave passing through any phase shifter; a second signal path in which a phase shifter for giving a phase difference of $\lambda/4$ is connected in series and which provides a second reflected wave shifted in phase by $\pi/2$ as compared with the first reflected wave; a third signal path in which a phase shifter for giving a phase difference of $\lambda/2$ is connected in series and which provides a third reflected wave shifted in phase by $\pi$ as compared with the first reflected wave; and a fourth signal path in which a phase shifter for giving a phase difference of $3\lambda/4$ is connected in series and which provides a fourth reflected wave shifted in phase by $3\pi/2$ as compared with the first reflected wave; wherein transmission data is divided into units of two bits, and a phase is assigned to a reflected wave by selecting a signal path corresponding to a combination of 0 and 1 of two bits, whereby QPSK (Quadri Phase Shift Keying) modulation is performed (see for example Japanese Patent Laid-Open No. 2005-136666).

In addition, a communication device has been proposed in which a first to a third phase shifter for giving a phase difference of $\lambda/8$ one way are connected in series with an antenna, and which includes: a first signal path that provides a first reflected wave by directly reflecting a received radio wave without the radio wave passing through any phase shifter; a second signal path that provides a second reflected wave shifted in phase by $\pi/2$ as compared with the first reflected wave after going and returning through the first phase shifter; a third signal path that provides a third reflected wave shifted in phase by $\pi$ as compared with the first reflected wave after going and returning through the first and second phase shifters; and a fourth signal path that provides a fourth reflected wave shifted in phase by $3\pi/2$ as compared with the first reflected wave after going and returning through the first to third phase shifters; wherein reflected waves having four phases different from each other by 90 degrees are created according to the values of two data bits, whereby QPSK-modulated reflected waves are created (see for example Japanese Patent Laid-Open No. 2005-136943).

These communication systems in which a QPSK modulation method is adopted in reflected wave transmission can achieve a higher transmission rate of data communication than ASK or PSK.

However, PSK modulation cannot increase transmission speed unless-bandwidth is widened, which is a problem also from a viewpoint of effective use of frequencies at a present time when the depletion of frequencies is regarded as a problem.

SUMMARY OF THE INVENTION

It is desirable to provide an excellent communication system and an excellent communication device of a reflected wave transmission (backscatter) type including a reflector (transponder) for transmitting data by a reflected wave formed by subjecting a non-modulated wave to a modulation process and a reflected wave reader (reader/writer) for reading the data from the modulated reflected wave signal from the reflector, and a communication device.

It is also desirable to provide an excellent communication system and an excellent communication device that can increase the speed of reflected wave transmission by increasing the number of levels of reflected waves.

An embodiment of the present invention has been made in view of the above problems. According to the embodiment of the present invention, there is provided a communication system of a backscatter type, the communication system including: a reflector for transmitting data by a reflected wave formed by subjecting a non-modulated wave to a modulation process; and a reflected wave reader for reading the data from the modulated reflected wave signal from the reflector; wherein the reflector includes an antenna for receiving a radio wave coming from a transfer destination, a phase controlling section configured to control a phase of the reflected wave with respect to the radio wave received by the antenna according to transmission data, and an amplitude controlling section configured to control the reflected wave controlled in phase by the phase controlling section in an amplitude direction according to the transmission data, and the reflector performs data transmission by a multilevel phase-modulated reflected wave signal, and the reflected wave reader transmits the non-modulated wave, and subjects the multilevel phase-modulated reflected wave signal from the reflector to a demodulation process.

The system described above refers to a logical set of a plurality of devices (or functional modules for realizing specific functions) regardless of whether each device or functional module is present within a single casing.

The embodiment of the present invention relates to a radio transmission system using radio wave reflecting techniques, which system includes a reflector for transmitting a reflected wave on which data is superimposed and a reflected wave reader for reading the data from the reflected wave from the reflector. When data is to be transmitted from the reflector side, the reflected wave reader transmits a non-modulated carrier, and the reflector sends out the data by subjecting the non-modulated carrier to a modulation process according to the transmission data using a load impedance operation such as turning on/off the termination of an antenna, for example. Then, the reflected wave reader side can obtain the transmission data by receiving the reflected wave and performing a demodulation and decoding process.

According to the reflected wave transmission system, the reflector side can send out a reflected wave signal by switching an antenna switch formed by a gallium arsenide FET or the like. Therefore data transmission can be performed with very low power consumption, which is an overwhelming difference in performance as compared with a common wireless LAN. The reflected wave transmission system is effective especially in a form of communication in which a ratio of transmission in one direction from a device including a reflector to a device including a reflected wave reader accounts for most of the communication.

However, there is a problem of insufficient transmission speed when ASK or PSK is applied as a modulation system for generating a reflected wave of backscatter. PSK modulation cannot increase transmission speed unless bandwidth is widened, which is a problem also from a viewpoint of effective use of frequencies at a present time when the depletion of frequencies is regarded as a problem.

On the other hand, in a reflected wave transmission system to which the embodiment of the present invention is applied, a communication device as reflector includes a phase controlling section configured to control a phase of a reflected wave with respect to a received radio wave according to transmission data, and an amplitude controlling section configured to control the reflected wave controlled in phase by the phase controlling section in an amplitude direction according to the transmission data, and the communication device generates a reflected wave signal by multilevel phase modulation.

More specifically, the phase controlling section includes an antenna switch formed by one of a diode and a gallium arsenide FET and a $\lambda/4$ (where $\lambda$ is a wavelength being used) phase shifter, the antenna switch and the $\lambda/4$ phase shifter being connected between the antenna and a ground, and the phase controlling section creates a high-frequency open and a high-frequency short by performing on/off control on the antenna switch according to a bit image of the transmission data, and controls the phase of the reflected wave by 180 degrees.

The amplitude controlling section has a variable high-frequency attenuator loaded between the antenna and the antenna switch, and controls an amount of attenuation of the reflected wave by changing a control voltage to the variable high-frequency attenuator to a plurality of levels according to the bit image of the transmission data.

Thus, the reflector can generate an eight-value PSK modulated reflected wave by performing amplitude control for four values and performing phase control for two values.

In addition, a reflector in a reflected wave transmission system according to an embodiment of the present invention includes a first signal line and a second signal line for a Q-axis, the second signal line having a phase difference of 90 degrees in both ways with respect to the first signal line. These signal lines can be connected to an antenna via a distributor.

In this case, the first signal line is formed by connecting a first antenna switch and a $\lambda/4$ (where $\lambda$ is a wavelength being used) first phase shifter between the antenna and a ground and connecting a first variable high-frequency attenuator between the antenna and the first antenna switch. The first signal line is used to generate the reflected wave of an I-axis signal. The second signal line is formed by connecting a second antenna switch and a $\lambda/4$ second phase shifter between the antenna and the ground and connecting a $\lambda/8$ phase shifter and a second variable high-frequency attenuator between the antenna and the second antenna switch. The second signal line is used to generate the reflected wave of a Q-axis signal.

The phase controlling section creates a high-frequency open and a high-frequency short by performing on/off control on the first antenna switch and the second antenna switch according to a bit image of the transmission data, and controls each of phases of respective reflected waves from the first signal line and the second signal line by 180 degrees. The amplitude controlling section controls an amount of attenuation of the reflected waves by changing a control voltage to the variable high-frequency attenuators to a plurality of levels according to the bit image of the transmission data.

Thus a multilevel QAM (Quadrature Amplitude Modulation) signal can be generated. For example, a 64-QAM modulated reflected wave can be generated by performing eight-value PSk using the first signal line for the I-axis and eight-value PSK using the second signal line for the Q-axis independently of each other, that is, by further adding quadrature modulation to eight-value PSK.

According to an embodiment of the present invention, the communication device transmitting data as a reflector can easily generate a high-speed reflected wave by backscatter of multilevel PSK (Phase Shift Keying) or multilevel QAM by a combination of a variable high-frequency attenuator and a high-frequency switch, and thereby achieve high-speed reflected wave transmission.

According to the embodiment of the present invention, it is possible to provide an excellent communication system and an excellent communication device that can increase the speed of reflected wave transmission by increasing the number of levels of reflected waves.

According to the embodiment of the present invention, it is possible to provide an excellent communication system and an excellent communication device that can increase the speed of reflected wave transmission by multilevel PSK or multilevel QAM.

According to the embodiment of the present invention, the reflector side can easily generate a high-speed reflected wave by backscatter of multilevel PSK or multilevel QAM by a combination of a variable high-frequency attenuator and a high-frequency switch, and thereby achieve high-speed reflected wave transmission. According to the embodiment, the generation of a reflected wave by backscatter can be performed with very low power consumption. The embodiment of the present invention is thus suitably applicable also to high-speed transmission by a mobile device driven by a battery, such as a digital camera, a portable telephone or the like.

Other and further objects, features, and advantages of the embodiment of the present invention will become apparent from more detailed description on the basis of embodiments of the present invention to be described later and accompanying drawings.

DETAILED DESCRIPTION OF THE PREFERRED EMBODIMENT

Preferred embodiment of the present invention will hereinafter be explained in detail with reference to the drawings.

Figure 1:
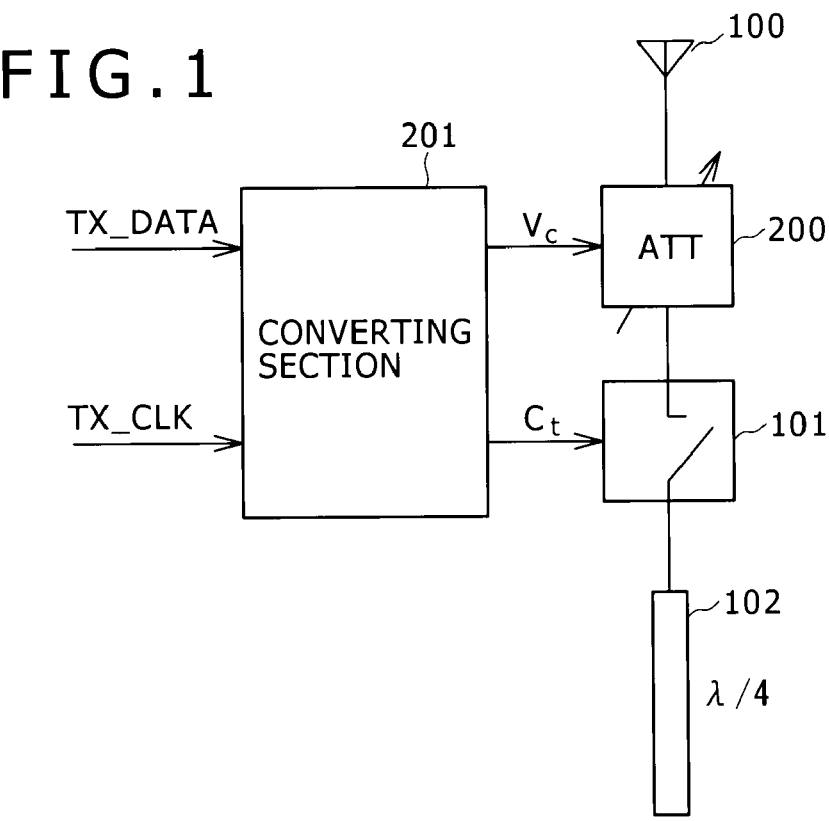
FIG. 1 is a diagram showing an example of configuration of a reflector that generates a multilevel PSK reflected wave.

FIG. 1 shows an example of configuration of a reflector that generates a multilevel PSK reflected wave. As with the reflector shown in FIG. 10, the reflector has an antenna 100 and a high-frequency switch 101 formed by a diode, a gallium arsenide FET or the like. One side of a strip line 102 as a λ/4 (where λ is a wavelength being used) phase shifter is open, and therefore when the high-frequency switch 101 is turned on, the antenna 100 is connected to a ground in terms of high frequency. The high-frequency switch 101 is subjected to on/off operation on the basis of transmission data (TX_DATA). The high-frequency switch 101 is controlled to be shorted when turned on, and is controlled to be open when turned off. Thus, by controlling a reflecting end to be shorted and open according to the transmission data, PSK modulation can be applied to the reflected wave of a radio wave arriving at the antenna 100.

Figure 10:
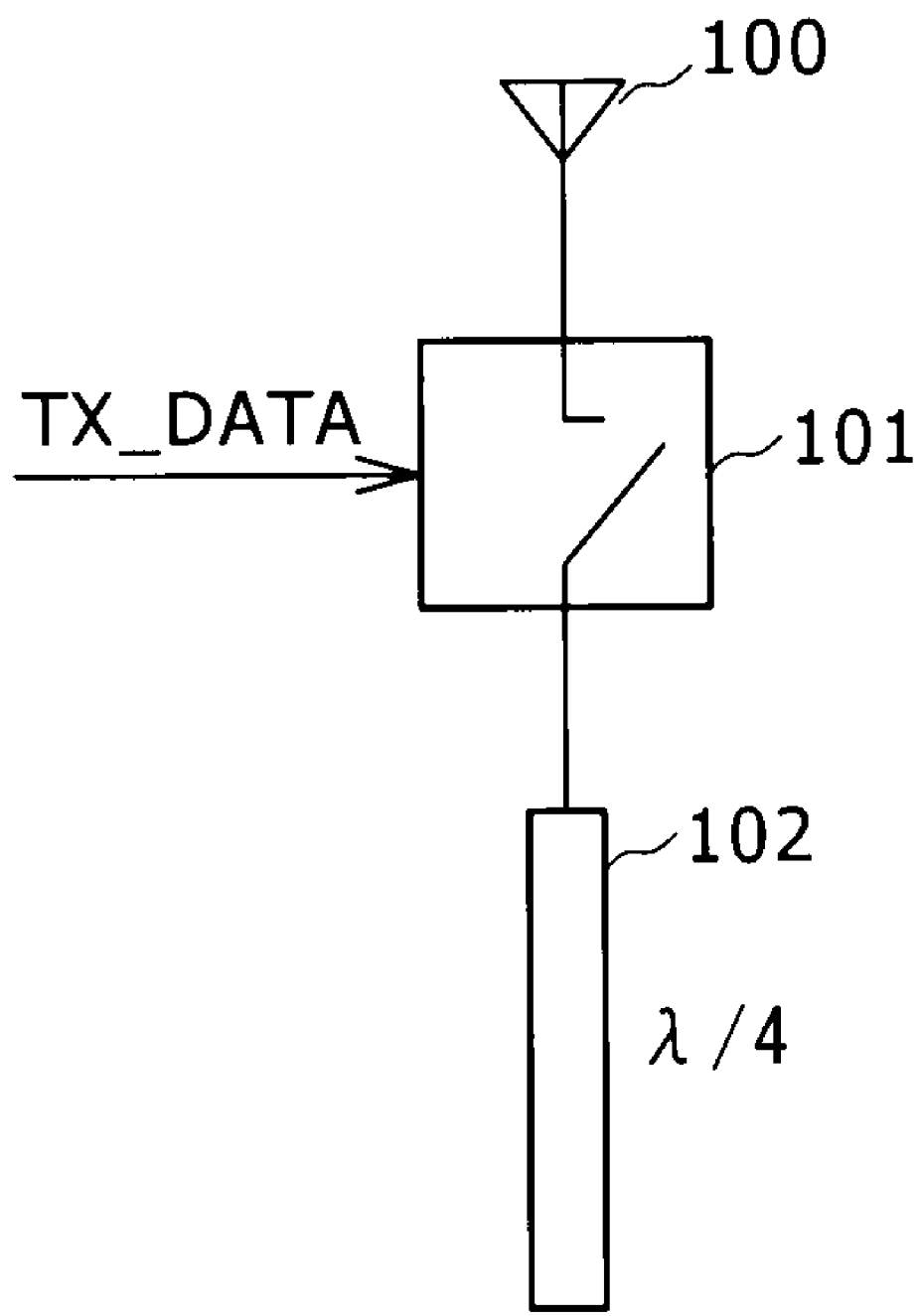
FIG. 10 is a diagram showing a configuration of a reflector that generates a reflected wave by PSK.

The reflector shown in FIG. 1 greatly differs from that of FIG. 10 in that the reflector shown in FIG. 1 has a variable high-frequency attenuator 200. The variable high-frequency attenuator 200 is formed by a diode, and is a circuit part that controls an amount of attenuation according to a direct-current voltage (well known). The variable high-frequency attenuator 200 is disposed between the antenna 100 and the high-frequency switch 101. Control in an amplitude direction of PSK is performed by the variable high-frequency attenuator 200.

The high-frequency switch 101 controls a phase by 180 degrees by creating a high-frequency open and a high-frequency short using the strip line 102 as a phase shifter, as described above. Therefore a multilevel PSK reflected wave can be generated by determining a half value in the amplitude direction by the variable high-frequency attenuator 200 and performing on/off operation on the high-frequency switch 101 and thereby rotating the phase by 180 degrees for the other half. Further, the radio wave received by the antenna 100 is attenuated by the variable high-frequency attenuator 200 to four levels according to the data, and subjected to PSK modulation by the high-frequency switch 101. As a result, PSK signals of eight values in total can be generated.

Figure 2:
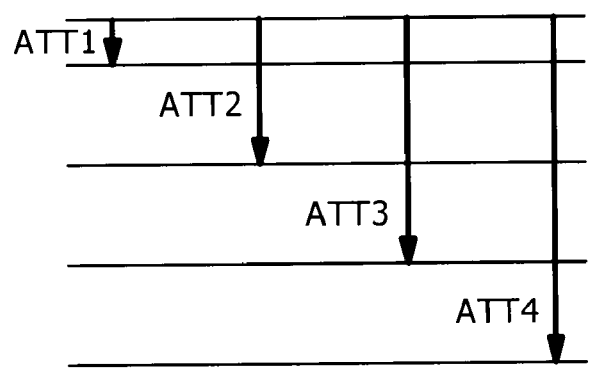
FIG. 2 is a diagram showing amounts of attenuation of the reflected wave by a variable high-frequency attenuator for creating four levels in an amplitude direction.

FIG. 2 shows amounts of attenuation of the reflected wave by the variable high-frequency attenuator 200 for creating the four levels in the amplitude direction. As shown in FIG. 2, the variable high-frequency attenuator 200 has an amount of attenuation ATT1 for a control voltage 51, similarly has an amount of attenuation ATT2 for a control voltage 52, has an amount of attenuation ATT3 for a control voltage 53, and has an amount of attenuation ATT4 for a control voltage 54.

A converting section 201 generates control voltages V1 to V4 to be supplied to the variable high-frequency attenuator 200 according to the transmission data (TX_DATA) and a transmission clock (TX_CLK). The converting section 201 also performs on/off control $C_t$ of the high-frequency switch 101 according to the transmission data (TX_DATA) and the transmission clock (TX_CLK).

Figure 3:
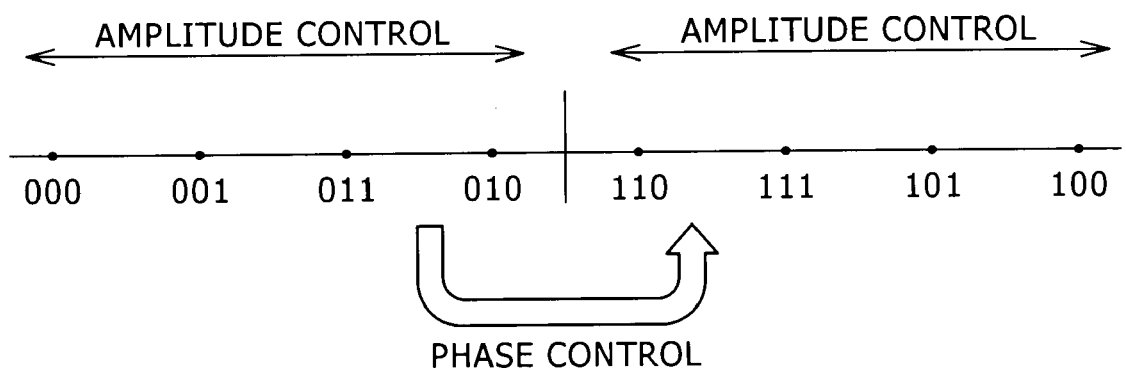
FIG. 3 is a diagram showing a signal constellation of eight-value PSK of the reflected wave modulated by the reflector shown in FIG. 1.

FIG. 3 shows a signal constellation of eight-value PSK of the reflected wave modulated by the reflector shown in FIG. 1. Because of eight-value PSK, data of three bits can be mapped per code point. The four levels of the right half or the left half of the signal constellation are controlled by the variable high-frequency attenuator 200, and the selection of the four left points or the four right points is controlled by the high-frequency switch 101. In the example shown in FIG. 3, the converting section 201 performs Gray coding, and performs mapping such that a difference between adjacent codes is one bit. This has an effect of minimizing an error even when a code is erroneously determined to be an adjacent code on a demodulating side.

A table below shows relation between three-bit transmission data, a control voltage $V_c$ for the variable high-frequency attenuator 200, and a control signal $C_t$ for the high-frequency switch 101.

TABLE 1

| CODE | $V_c$ | $C_t$ |
| --- | --- | --- |
| 000 | V1 | 0 |
| 001 | V2 | 0 |
| 010 | V4 | 0 |
| 011 | V3 | 0 |
| 100 | V1 | 1 |
| 101 | V2 | 1 |
| 110 | V4 | 1 |
| 111 | V3 | 1 |

In short, the reflector shown in FIG. 1 generates an eight-value PSK modulated reflected wave by performing amplitude control for four values and performing phase control for two values.

Figure 4:
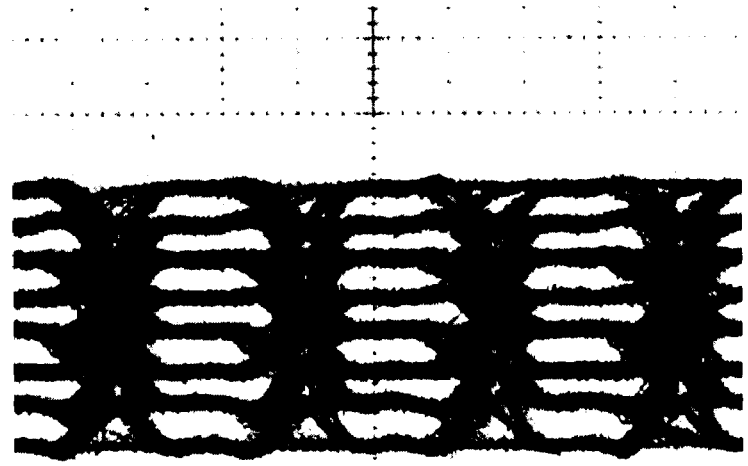
FIG. 4 is a diagram showing each of input of four values of a direct-current control voltage $V_c$ to the variable high-frequency attenuator and an eight-value PSK eye pattern output by synchronous detection on a receiving side at the time of the input.

FIG. 4 shows each of input of four values of the direct-current control voltage $V_c$ to the variable high-frequency attenuator 200 and an eight-value PSK eye pattern output by synchronous detection on a receiving side (reflected wave reader) at the time of the input. It is understood from FIG. 4 that the eight-value PSK reflected wave generated by the reflector shown in FIG. 1 can be demodulated on the receiving side.

It will be understood from the description so far that a high-speed multilevel PSK modulated wave can be generated easily by a high-frequency attenuator and a high-frequency switch.

Figure 5:
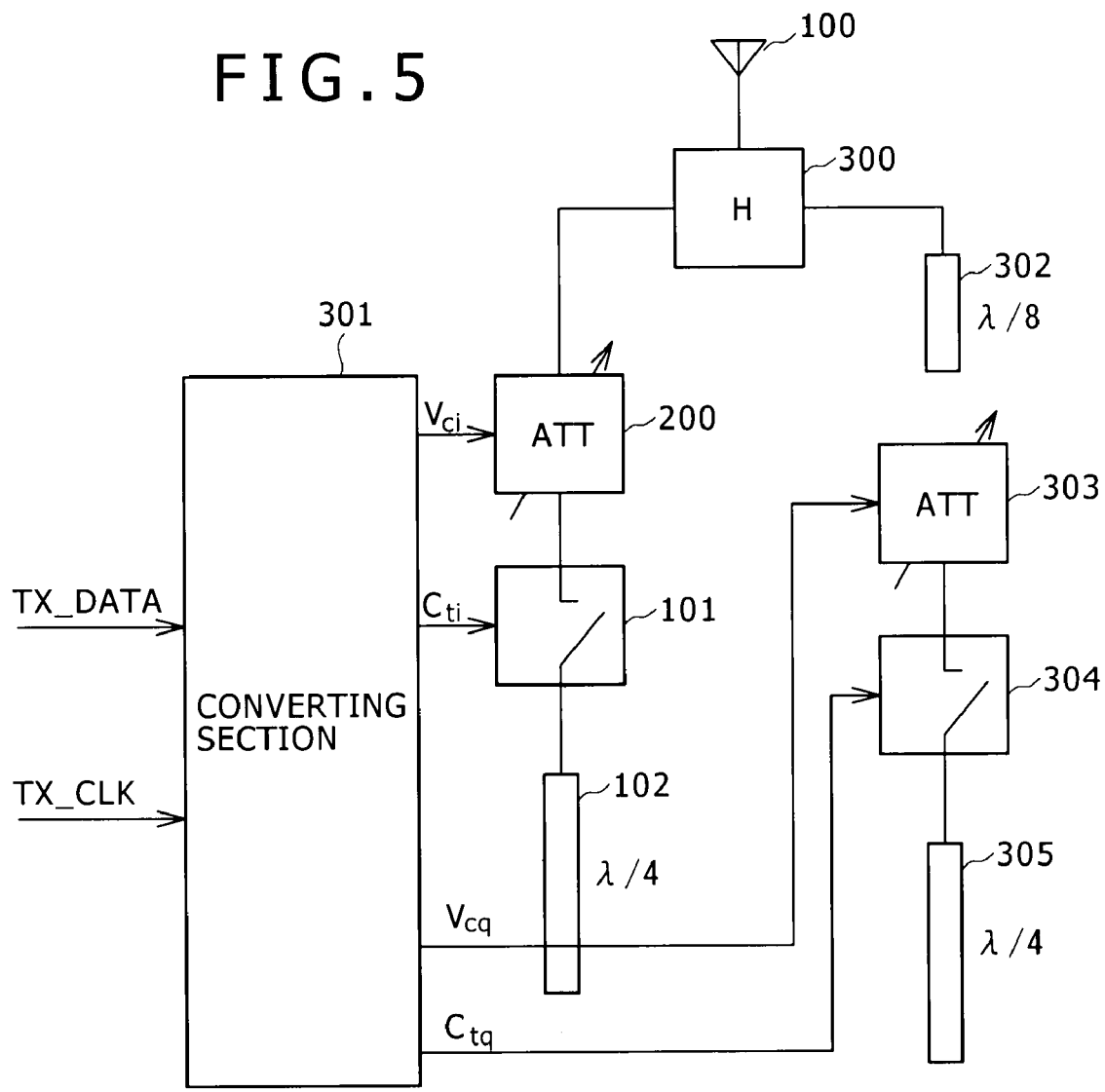
FIG. 5 is a diagram showing an example of configuration of a reflector that performs 64 QAM.

FIG. 5 shows an example of configuration of a reflector that performs multilevel (64) QAM. The example of configuration is different from the example of configuration shown in FIG. 1 in that a signal input by an antenna 100 is distributed by a distributor 300, a phase difference of 90 degrees is created by making one signal go and return through a strip line 302 as a λ/8 phase shifter, thereby creating two orthogonal carriers, and operation of phase control and attenuation control similar to that of the reflector shown in FIG. 1 is performed on each of the two orthogonal carriers, whereby a reflected wave is modulated.

Reference numerals 102 and 305 denote strip lines as a λ/4 phase shifter, which are provided to make a short in terms of high frequency when high-frequency switches 101 and 304 are on.

A converting section 301 is formed by changing the converting section 201 in eight-value PSK as shown in FIG. 1 for 64 QAM. According to transmission data (TX_DATA) and a transmission clock (TX_CLK), the converting section 301 generates a control voltage $V_{ci}$ for a variable high-frequency attenuator 200 and a control signal $C_{ti}$ for a high-frequency switch 101 on an I (Inphase) axis and a control voltage $V_{cq}$ for a variable high-frequency attenuator 303 and a control signal $C_{tq}$ for a high-frequency switch 304 on a Q (Quadrature phase) axis. An eight-value PSK signal generated by the variable high-frequency attenuator 200 and the high-frequency switch 101 on the I-axis and an eight-value PSK signal generated by the variable high-frequency attenuator 303 and the high-frequency switch 304 on the Q-axis are independent of each other. Therefore the reflector shown in FIG. 5 generates a 64-QAM reflected wave.

Figure 6:
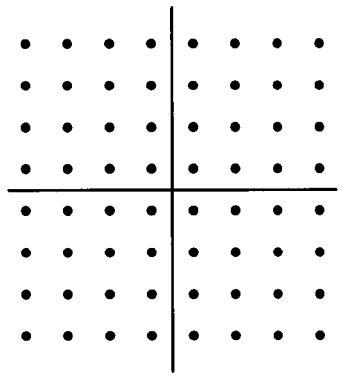
FIG. 6 is a diagram showing an example of a signal constellation of 64 QAM of a reflected wave signal generated by the reflector shown in FIG. 5.

FIG. 6 shows an example of a signal constellation of 64 QAM of the reflected wave signal generated by the reflector shown in FIG. 5. It will be understood from FIG. 6 that a higher speed can be achieved by performing the eight-value PSK shown in FIG. 3 on the I-axis and the Q-axis independently and thus increasing signal points. A method of generating each of the control signals $V_{ci}$, $V_{cq}$, $C_{ti}$, and $C_{tq}$ in the converting section 301 basically follows the example of operation of the reflector shown in FIG. 1 (method of generating the control signals $V_c$ and $C_t$). The method is not the essence here, and therefore details thereof will be omitted.

The reflector shown in FIG. 1 generates an eight-value PSK modulated reflected wave by performing amplitude control for four values and performing phase control for two values. On the other hand, the reflector shown in FIG. 5 can generate a 64-QAM modulated reflected wave by further adding quadrature modulation to eight-value PSK.

Figure 7:
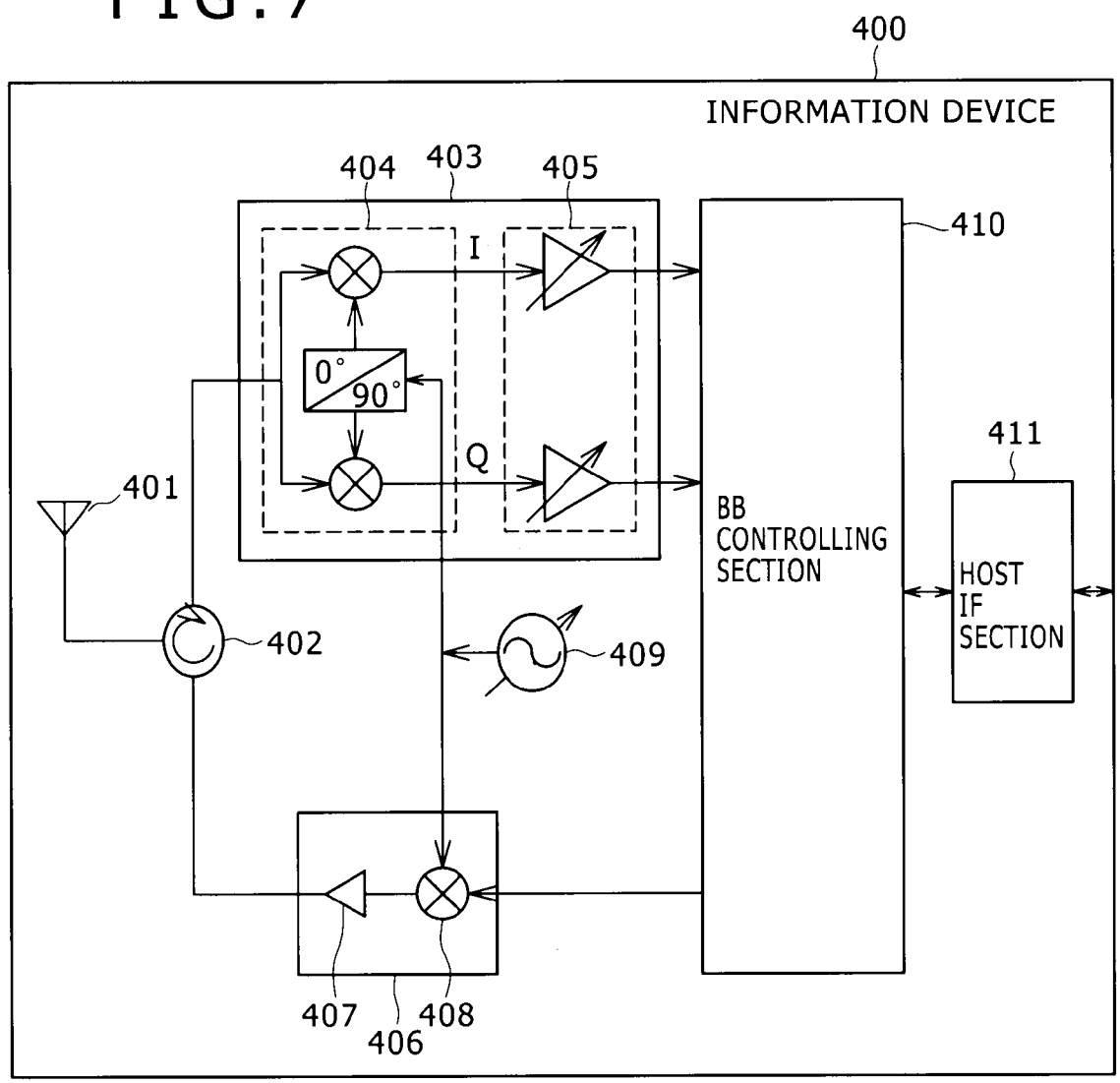
FIG. 7 is a diagram showing an example of configuration of a reflected wave reader that receives a multilevel PSK reflected wave signal sent from a reflector as shown in FIG. 1 or a multilevel QAM reflected wave signal sent from a reflector as shown in FIG. 5.
Figure 8:
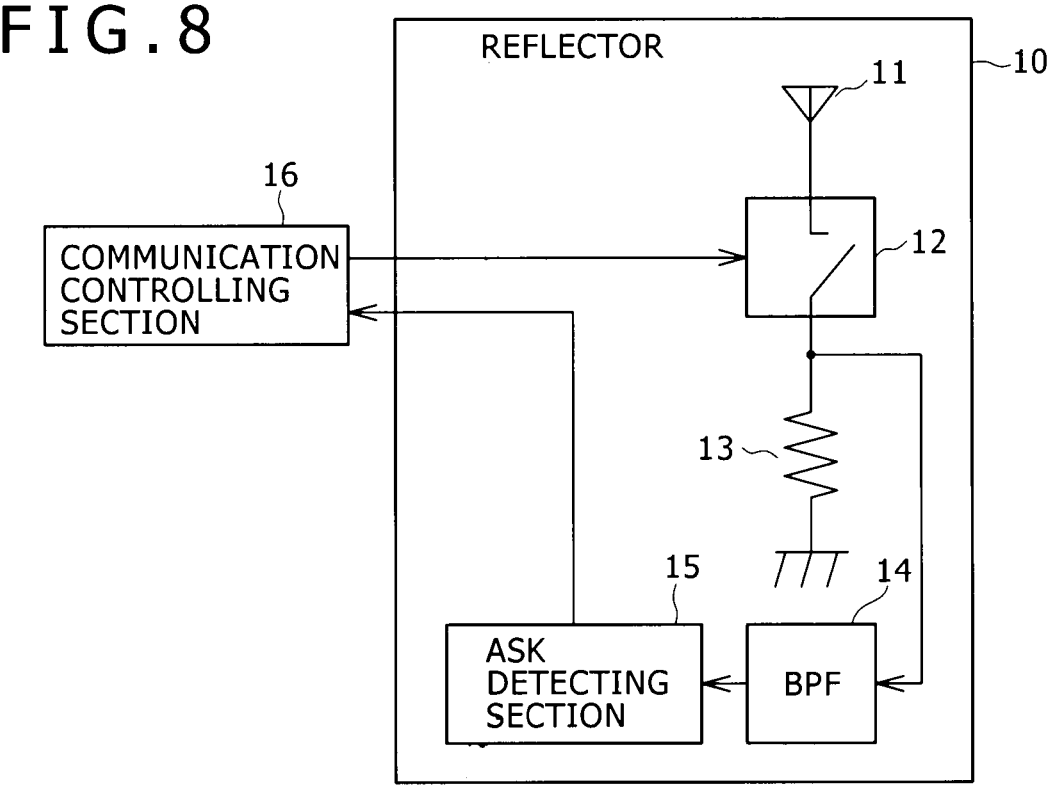
FIG. 8 is a diagram showing a configuration of a reflector as a data transmitting source in a reflected wave transmission system.
Figure 9:
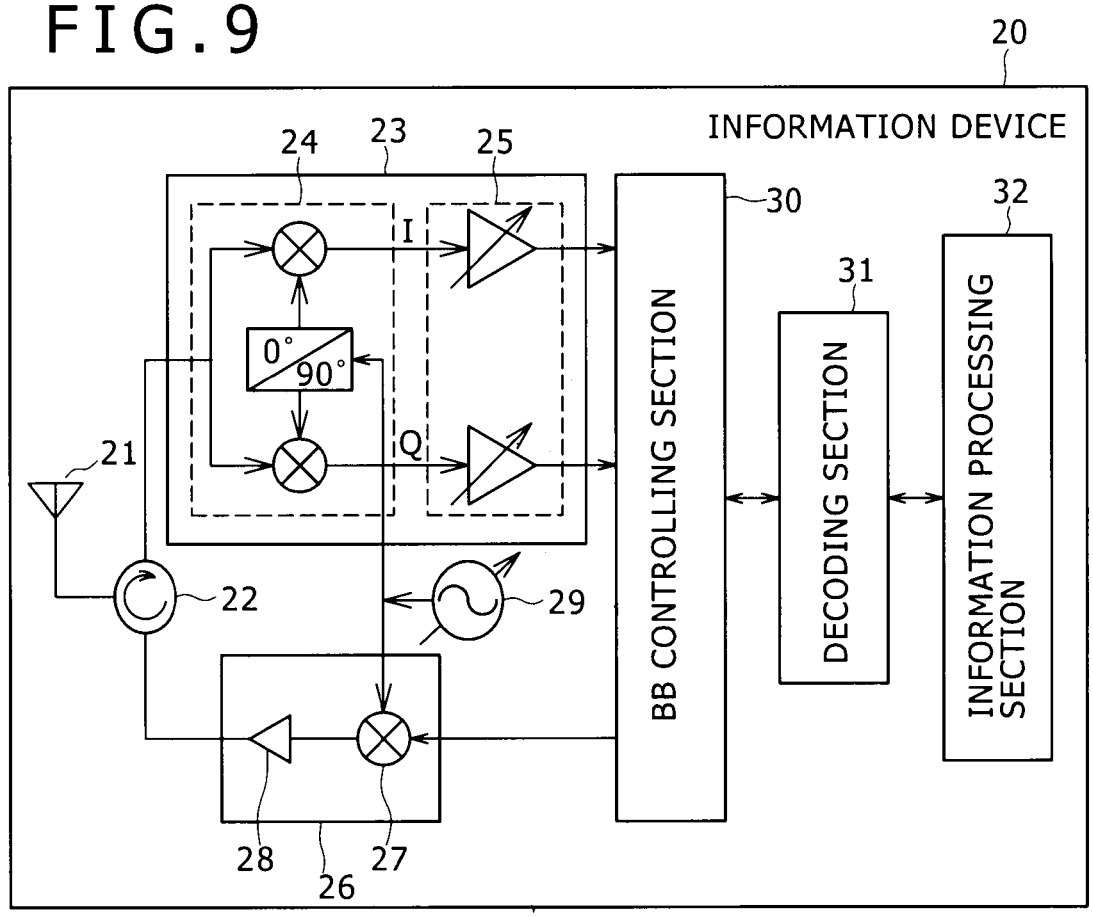
FIG. 9 is a diagram showing a hardware configuration of an information device having a reflected wave reader function as a data receiving destination in the reflected wave transmission system.

FIG. 7 shows an example of configuration of a reflected wave reader that receives a multilevel PSK reflected wave signal sent from a reflector as shown in FIG. 1 or a multilevel QAM reflected wave signal sent from a reflector as shown in FIG. 5.

A reflected wave reader 400 shown in FIG. 7 includes an antenna 401 for a 2.4 GHz band, a circulator 402, a receiving section 403, a transmitting section 406, a frequency synthesizer 409, a communication controlling section 410, and a host interface section 411. Further, the receiving section 403 includes a quadrature detecting block 404 and an AGC amplifier 405. The transmitting section 406 includes a mixer 408 and a power amplifier 407. The host interface section 411 is connected to a host device (not shown) such as a PC (personal computer) or the like to transfer received data to the host device.

The transmission of a non-modulated wave from the reflected wave reader 400 is achieved by supplying a certain direct-current voltage from the communication controlling section 410 to the mixer 408. The frequency of the non-modulated carrier to be transmitted is determined by the frequency of the frequency synthesizer controlled from the communication controlling section 410. The 2.4 GHz band is used in the example shown in FIG. 7. The non-modulated carrier as output of the mixer 408 is amplified to a predetermined level by the power amplifier 407, and then sent out from the antenna 401 via the circulator 402.

A reflected wave from the reflector shown in FIG. 1 or FIG. 5 has the same frequency as transmitted from the transmitting section 406. The reflected wave is received by the antenna

401, and then input to the receiving section 403 via the circulator 402. Because the same local frequency as in transmission is input to the quadrature detecting block 404, a multilevel PSK or a multilevel QAM modulating wave appears in the output of the quadrature detecting block 404. However, the received signal is different in phase from the local signal, and therefore a modulating signal corresponding to a phase difference between the signals appears on an I-axis and a Q-axis.

The gain of the AGC amplifier 405 is controlled to an optimum value, and output signals of the AGC amplifier 405 are sent to the communication controlling section 410.

The communication controlling section 410 performs synchronous detection from the two I-axis and Q-axis signals, and demodulates the I-axis and Q-axis signals into digital data. Then, the correctly demodulated data is transferred to the host device via the host interface section 411.

The present invention has been explained above in detail with reference to specific embodiments thereof. It is obvious, however, that modifications and substitutions in the embodiments may be made by those skilled in the art without departing from the spirit of the present invention.

The present invention enables the generation of a reflected wave by backscatter with very low power consumption, and is thus suitably applicable also to high-speed transmission by a mobile device driven by a battery, such as a digital camera, a portable telephone or the like.

In short, the present invention has been disclosed in a form that is illustrative, and contents described in the present specification are not to be construed in a restrictive manner. In order to determine the spirit of the present invention, the section of claims is to be considered.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system of a backscatter type, the communication system comprising:
    a reflector that transmits data by a reflected wave formed by subjecting a non-modulated wave to a modulation process; and
    a reflected wave reader that reads the data from the modulated reflected wave from the reflector, wherein,
    the reflector includes:
        an antenna that receives a radio wave coming from a transfer destination;
        a phase controller that controls a phase of the reflected wave with respect to the radio wave received by the antenna according to transmission data;
        an amplitude controller that controls the reflected wave controlled in phase by the phase controller in an amplitude direction according to the transmission data;
        a signal line formed by connecting an antenna switch formed by one of a diode and a gallium arsenide field-effect transistor and a $\lambda/4$ (where $\lambda$ is a wavelength being used) phase shifter, the antenna switch and the $\lambda/4$ phase shifter being connected between the antenna and a ground, and connecting a variable high-frequency attenuator between the antenna and the antenna switch,
    the reflector performs data transmission by a multilevel phase-modulated reflected wave signal, and
    the reflected wave reader transmits the non-modulated wave, and subjects the multilevel phase-modulated reflected wave signal from the reflector to a demodulation process.

2. The communication system according to claim 1,
    wherein the phase controller creates a high-frequency open and a high-frequency short by performing on/off control on the antenna switch according to a bit image of the transmission data, and controls the phase of the reflected wave by 180 degrees.

3. The communication system according to claim 2,
    wherein the amplitude controller controls an amount of attenuation of the reflected wave by changing a control voltage to the variable high-frequency attenuator to a plurality of levels according to the bit image of the transmission data.

4. A communication device for communicating data by a backscatter system using reflection of a received radio wave, the communication device comprising:
    an antenna for receiving a radio wave coming from a transfer destination;
    a phase controller that controls a phase of a reflected wave with respect to the radio wave received by the antenna according to transmission data; and
    an amplitude controller that controls the reflected wave controlled in phase by the phase controlling means in an amplitude direction according to the transmission data, wherein,
    the phase controller includes a first antenna switch formed by one of a diode and a gallium arsenide FET and a $\lambda/4$ (where $\lambda$ is a wavelength being used) phase shifter,
    the antenna switch and the $\lambda/4$ phase shifter being connected between the antenna and a ground, and
    the phase controller creates a high-frequency open and a high-frequency short by performing on/off control on the antenna switch according to a bit image of the transmission data, and controls the phase of the reflected wave by 180 degrees.

5. The communication device according to claim 4,
    wherein the amplitude controller includes a variable high-frequency attenuator loaded between the antenna and the antenna switch, and controls an amount of attenuation of the reflected wave by changing a control voltage to the variable high-frequency attenuator to a plurality of levels according to the bit image of the transmission data.

6. The communication device according to claim 4, further comprising:
    a first signal line for an I-axis, the first signal line branching off from the antenna via a distributor, and the first signal line being formed by connecting the first antenna switch and the $\lambda/4$ first phase shifter between the antenna and a ground and connecting a first variable high-frequency attenuator between the antenna and the first antenna switch; and
    a second signal line for a Q-axis, the second signal line having a phase difference of 90 degrees in both ways with respect to the first signal line, the second signal line being formed by connecting a second antenna switch and a $\lambda/4$ second phase shifter between the antenna and the ground and connecting a $\lambda/8$ phase shifter and a second variable high-frequency attenuator between the antenna and the second antenna switch, wherein,
    the phase controller creates a high-frequency open and a high-frequency short by performing on/off control on the first antenna switch and the second antenna switch according to a bit image of the transmission data, and controls each of phases of respective reflected waves from the first signal line and the second signal line by 180 degrees, and the amplitude controller controls an amount of attenuation of the reflected waves by changing a control voltage to the variable high-frequency attenuators to a plurality of levels according to the bit image of the transmission data, whereby a multilevel QAM (Quadrature Amplitude Modulation) signal is generated.

7. A communication system of a backscatter type, the communication system comprising:
   a reflector that transmits data by a reflected wave formed by subjecting a non-modulated wave to a modulation process; and
   a reflected wave reader that reads the data from the modulated reflected wave from the reflector, wherein,
   the reflector includes:
      an antenna that receives a radio wave coming from a transfer destination;
      a phase controller that controls a phase of the reflected wave with respect to the radio wave received by the antenna according to transmission data;
      an amplitude controller that controls the reflected wave controlled in phase by the phase controller in an amplitude direction according to the transmission data;
      a first signal line for an I-axis, the first signal line branching off from the antenna via a distributor, and the first signal line being formed by connecting a first antenna switch and a λ/4 (where λ is a wavelength being used) first phase shifter between the antenna and a ground and connecting a first variable high-frequency attenuator between the antenna and the first antenna switch, and
      a second signal line for a Q-axis, the second signal line having a phase difference of 90 degrees in both ways with respect to the first signal line, the second signal line being formed by connecting a second antenna switch and a λ/4 second phase shifter between the antenna and the ground and connecting a λ/8 phase shifter and a second variable high-frequency attenuator between the antenna and the second antenna switch,
   the reflector performs data transmission by a multilevel phase-modulated reflected wave signal, and
   the reflected wave reader transmits the non-modulated wave, and subjects the multilevel phase-modulated reflected wave signal from the reflector to a demodulation process.

8. The communication system according to claim 7, wherein,
   the phase controller creates a high-frequency open and a high-frequency short by performing on/off control on the first antenna switch and the second antenna switch according to a bit image of the transmission data, and controls each of phases of respective reflected waves from the first signal line and the second signal line by 180 degrees, and
   the amplitude controller controls an amount of attenuation of the reflected waves by changing a control voltage to the variable high-frequency attenuators to a plurality of levels according to the bit image of the transmission data, whereby a multilevel QAM (Quadrature Amplitude Modulation) signal is generated.

* * * * *